United States Patent
Friedrich

(10) Patent No.: US 7,893,815 B2
(45) Date of Patent: Feb. 22, 2011

(54) METHOD FOR SELECTING ONE OR SEVERAL TRANSPONDERS

(75) Inventor: Ulrich Friedrich, Ellhofen (DE)

(73) Assignee: Atmel Automotive GmbH, Heilbronn (DE)

( * ) Notice: Subject to any disclaimer, the term of this patent is extended or adjusted under 35 U.S.C. 154(b) by 853 days.

(21) Appl. No.: 11/580,846

(22) Filed: Oct. 16, 2006

(65) Prior Publication Data

US 2007/0030126 A1   Feb. 8, 2007

Related U.S. Application Data

(63) Continuation of application No. PCT/EP2005/003909, filed on Apr. 14, 2005.

(30) Foreign Application Priority Data

Apr. 14, 2004  (DE) .............. 10 2004 018 541

(51) Int. Cl.
  *H04Q 5/22* (2006.01)
(52) U.S. Cl. .............. 340/10.2; 340/10.1; 340/10.31; 340/10.4; 340/572.1
(58) Field of Classification Search .............. 340/10.2, 340/10.1, 10.31, 10.4, 572.1; 370/311, 350, 370/345, 349; 341/179, 178; 714/799, 823
See application file for complete search history.

(56) References Cited

U.S. PATENT DOCUMENTS

| | | | |
|---|---|---|---|
| 4,551,839 A * | 11/1985 | Botrel et al. ................. 714/751 |
| 5,841,770 A * | 11/1998 | Snodgrass et al. ........... 370/346 |
| 5,856,788 A | 1/1999 | Walter et al. |
| 6,008,727 A * | 12/1999 | Want et al. ............... 340/572.1 |
| 6,061,344 A * | 5/2000 | Wood, Jr. ..................... 370/346 |
| 6,181,257 B1 * | 1/2001 | Meek et al. ............ 340/870.01 |
| 6,275,476 B1 | 8/2001 | Wood, Jr. |
| 6,331,976 B1 * | 12/2001 | Sriram ........................ 370/350 |
| 6,774,766 B1 * | 8/2004 | Moyer ...................... 340/10.32 |
| 7,016,311 B2 * | 3/2006 | Tiernay et al. .............. 370/252 |
| 7,030,731 B2 * | 4/2006 | Lastinger et al. ........... 340/10.1 |
| 7,102,488 B2 | 9/2006 | Friedrich |
| 7,215,976 B2 * | 5/2007 | Brideglall ................. 455/552.1 |
| 7,256,695 B2 * | 8/2007 | Hamel et al. ............. 340/572.1 |
| 7,411,921 B2 * | 8/2008 | Strong et al. ................ 370/328 |

(Continued)

FOREIGN PATENT DOCUMENTS

DE  196 46 153   5/1998

(Continued)

*Primary Examiner*—Brian A Zimmerman
*Assistant Examiner*—Nam V Nguyen
(74) *Attorney, Agent, or Firm*—Muncy, Geissler, Olds & Lowe, PLLC

(57) ABSTRACT

A method for selecting at least one transponder or a sensor in RFID or remote-sensor systems provided with a plurality of transponders or sensors (tags), in particular in systems provided with a plurality of reading devices, is disclosed. The inventive method includes the feature that in pre-selecting individual transponders or sensors by at least one reading device and, after the successful selection of at least one transponder or sensor, data, in particular for conforming the pre-selection, is asynchronously transmitted during at least one protocol section from the transponder or sensor to the reading device. The invention makes it possible to efficiently reduce the potentially disturbing control signals of the reading device(s), thereby improving the transmission characteristics of said systems.

33 Claims, 2 Drawing Sheets

U.S. PATENT DOCUMENTS

| | | |
|---|---|---|
| 2004/0046642 A1 | 3/2004 | Becker et al. |
| 2005/0024186 A1 | 2/2005 | Friedrich |
| 2005/0210360 A1 | 9/2005 | Friedrich |
| 2005/0212661 A1 | 9/2005 | Friedrich |

FOREIGN PATENT DOCUMENTS

| | | |
|---|---|---|
| DE | 102 04 346 | 8/2003 |
| DE | 103 36 308 | 3/2005 |
| DE | 10 2004 013 837 | 10/2005 |
| DE | 10 2004 014 562 A1 | 10/2005 |
| EP | 1 239 401 A1 | 9/2002 |
| WO | WO 02/093522 A1 | 11/2002 |
| WO | WO 2004/021257 A1 | 3/2004 |
| WO | WO 2005/025480 A2 | 2/2005 |

\* cited by examiner

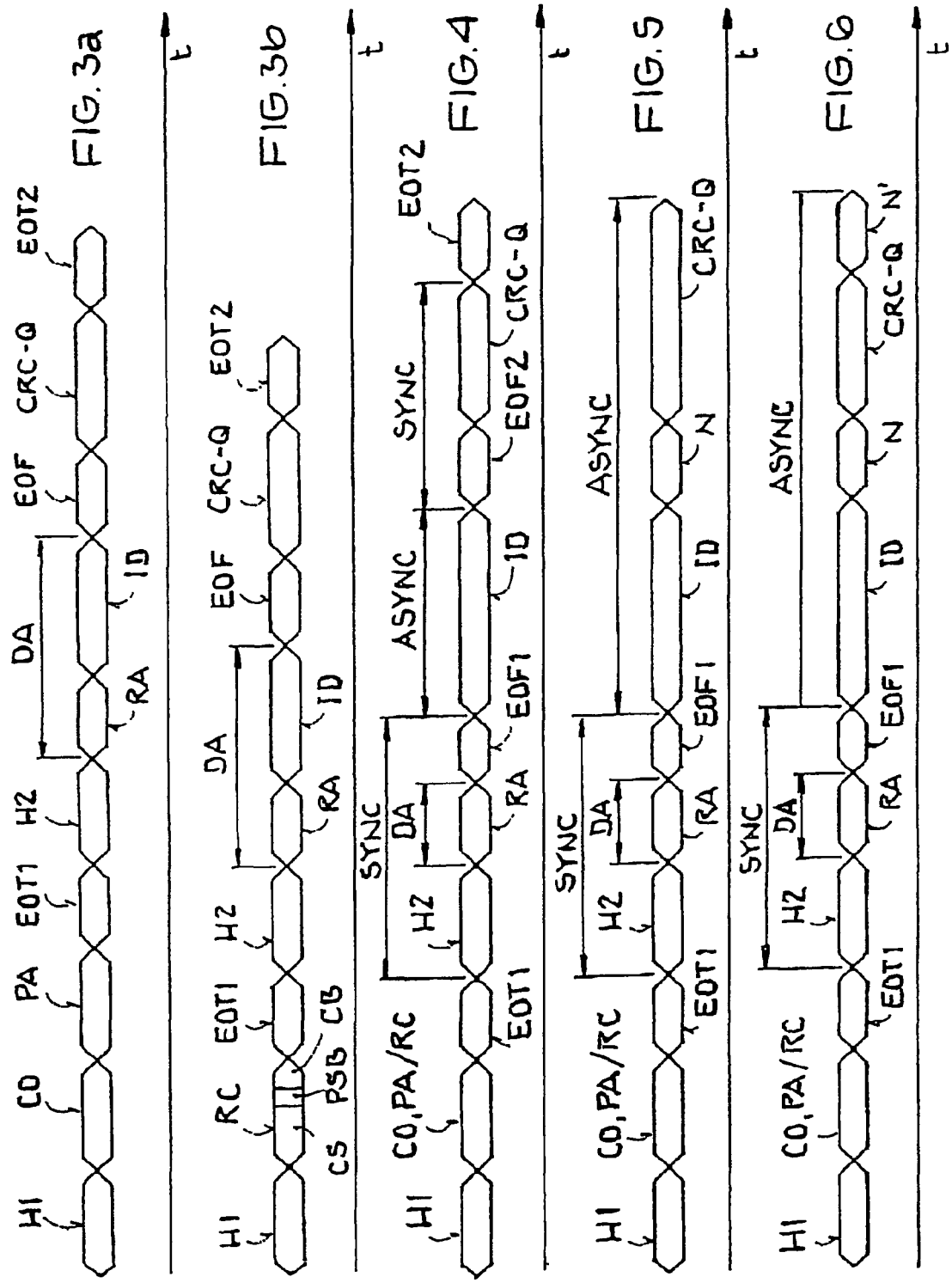

METHOD FOR SELECTING ONE OR SEVERAL TRANSPONDERS

This nonprovisional application is a continuation of International Application No. PCT/EP2005/003909, which was filed on Apr. 14, 2005, and which claims priority to German Patent Application No. DE 102004018541, which was filed in Germany on Apr. 14, 2004, and which are both herein incorporated by reference.

BACKGROUND OF THE INVENTION

1. Field of the Invention

The invention relates to a method for selecting at least one transponder or sensor in RFID or remote sensor systems having a plurality of transponders or sensors, in particular systems with a plurality of reading devices.

2. Description of the Background Art

Automatic identification methods, also known as Auto-ID, have become widespread in recent years in many service fields, in procurement and distribution logistics, in trade, in production, and in material flow systems. The goal of Auto-ID in this context is the comprehensive provision of information concerning persons, animals, objects and goods.

One example of such Auto-ID systems is the now widely used chip card, in which a silicon memory chip is powered, read, and if necessary reprogrammed, by a reading device by mechanical galvanic contact. In this context, the acquisition device is generally referred to as a reading device regardless of whether it can only read data or can also write it.

In RFID systems, power can be supplied to the data carrier—the transponder—not only by galvanic contact, but also in a non-contact manner using electromagnetic fields in the radio frequency range (RF, radio frequency).

RFID systems include two basic components, namely the transponder or—in the case of a remote sensor system—the sensor, i.e. an integrated circuit (IC) with a coupling element such as a dipole antenna as a transmitting and receiving means, and the reading device (also called the base station), which is typically a high-frequency module (transmitter/receiver) and likewise has a coupling element. The reading device regularly supplies the transponder or the sensor, which need not have its own voltage supply, with energy; data are transmitted both from the reading device to the transponder (forward link) and in the opposite direction (return link). Such RFID systems, whose range is significantly greater than 1 m, use electromagnetic waves in the UHF and microwave regions. These systems mostly use a backscatter method, named for its physical principle of operation; in this method, a part of the energy arriving at the transponder from the reading device is reflected (scattered back, hence backscattering) and may be modulated in the process in order to transmit data: The IC receives, through the coupling element, a high frequency carrier, some of which it transmits back to the reading device through suitable modulating and backscattering devices.

When multiple transponders or sensors—hereinafter referred to by the generalized term, tags—are located in an RF field of a reading device, the reading device must carry out an appropriate selection process prior to data transmission if the data transmission is only to take place between one tag or one group of tags and the base station. In particular, the reading device must single out the tags, for example in order to determine their identification. These processes are also known as "anticollision methods."

To begin with, stochastic, ALOHA-based anticollision methods are known in this regard (see Finkenzeller, "RFID Handbuch," Hanser Verlag, third edition, p. 210 ff), which has been published in English by John Wiley & Sons., however these have inherent speed disadvantages.

In addition, each of the tags in the simplest case is distinguished by an identifying bit sequence, known as a unique ID or UID, that has been statically predefined by the manufacturer and is stored in the tag. Using this UID, a reading device can address the tags individually or as a group. A suitable method is known from U.S. Pat. No. 5,856,788, for example. In this method, selection takes place on the basis of a bitwise comparison of the unique, statically defined identifying bit sequence with a selection bit sequence transmitted by the reading device. Such selection methods are also referred to as deterministic, in contrast to the aforementioned stochastic methods.

Another deterministic anticollision routine is known from DE 102 04 346, which corresponds to U.S. Pat. No. 7,102,488, and which is incorporated herein by reference.

Nonetheless, it can easily happen in open systems that a unique UID is no longer guaranteed on account of the variety of existing UID specifications. For this reason, a German application DE 103 36 308, which corresponds to U.S. Publication No. 2005024186, and which is incorporated herein by reference, expands the identifying bit sequence of the tags by the addition of a random element, so that a deterministic selection can take place even when the identifying bit sequence is not unique.

In general, however, for any type of deterministic selection method, it must be considered a disadvantage that the reading device has to regularly transmit control signals in the form of clock ticks or notches (modulation dips) at the bit boundaries for control purposes.

In the backscattering-based RFID and remote sensor systems the reading device in typical applications transmits an RF carrier at 30 dBm and a modulated signal of appropriate bandwidth whose spectrum is produced by the carrier and the modulation (through the sidebands produced by the clock tick transmission). The tags radiate back only a portion of the transmitted or received energy, so that the reading device receives a signal at approximately −70 dBm, which is only slightly above the ambient noise for a noise spectrum of other RF services. The boundary levels for GSM or comparable applications are at −36 dBm. Sidebands from the reading device produced in RFID applications must be below −54 dBm, which is to say they are sometimes stronger than the desired signal, but they can easily be filtered out in the frequency domain. Accordingly, the received channel of the reading device must be designed to be extremely sensitive; however, it must be considered a disadvantage here that every reading device thus of necessity also receives the interfering, generally asynchronous transmissions from other reading devices in the system together with their associated sidebands.

Not least on account of the aforementioned reasons, the processing speed is generally one of the most important optimization goals in RFID applications. This is especially true in the area of UHF (ultra high frequency) and microwave systems, where field gaps can regularly occur as a result of reflections. Moreover, especially in long-range systems, distant and/or moving objects, for example in package distribution or stacker applications, produce continuous background noise and result in further problems on account of differing reflection characteristics.

Consequently, it is known in conventional RFID systems, such as described in ISO standard 18000-6, for example, to use commands that are kept as short as possible for communicating with tags by a reading device, with such commands generally being used to transmit only default settings such as a (memory) address on the tag. Thus, for example, it is customary to address the ID of the tag with such commands. Deviation of the application from such settings, e.g. to query data other than the tag ID, has the result that either the reading device must transmit long command sequences (separation by means of an anticollision routine followed by a READ command to read out the data in question) or an anticollision command is issued containing appropriate parameters, e.g. the bit address to be read out. If, in addition, the aforementioned ambient conditions also change during the course of the anticollision procedure, further time-consuming adjustments, such as the data stream coding, must also be made.

Such a conventional procedure thus results in prolonged anticollision routines with the aforementioned adverse effects on data transmission in RFID systems.

In WO 2004/021257 A, a method for data transmission is described, which functions asynchronously, at least in part.

SUMMARY OF THE INVENTION

It is therefore an object of the present invention to provide a method for avoiding the above-described disadvantages, in such a manner that adverse effects of transmission properties resulting from clock/notch signals of the reading device or devices are reduced to a minimum, while simultaneously guaranteeing rapid and reliable selection of individual transponders or sensors (tags) or groups thereof, even in open systems.

The object is attained by a method in that individual transponders or sensors are preselected by at least one reading device and in that, after preliminary selection of at least one transponder or sensor has taken place, data, in particular for confirming the preselection, are transmitted asynchronously from the transponder or sensor to the reading device during at least one protocol segment. An important advantage of asynchronous transmission after preselection of one or more tags is that during the relevant protocol segment, is used in particular to confirm the preselection, no notch signals need be sent to the tags, so that transmission from the reading device does not generate any sidebands along with the carrier which could have interfering effects on communication between other tags and reading devices.

In an embodiment, it is provided that the preselection takes place deterministically in a conventional manner, wherein for purposes of selection, the tags can each generate a first bit sequence with a length of m bits, wherein the first bit sequence is generated at least when an asynchronous transmission mode has been selected for a return data link from the tags to the reading device. Otherwise, a synchronous data transmission is always to be preferred on account of the more favorable signal-to-noise ratio. A suitable method for switching between synchronous and asynchronous return links is the subject of German application DE 102004014562.8, which corresponds to U.S. Publication No. 20050212661, which is incorporated herein by reference. Thus, in combination with the inventive deterministic selection procedure, backwards compatibility with established prior art solutions is provided.

For the purpose of preselection of a tag, an identifying bit sequence can be used which has a length of n bits with $n \leq m$, which sequence in a further embodiment is extracted from the first bit sequence. In accordance with the invention this first bit sequence can be produced from a random number and/or a memory content of the tag, for example by a random number in combination with a stored tag UID. For tags with correspondingly longer range, it is necessary in this regard to take into account that the system's RF field may possibly contain more than 200 tags which must then be singularized by a suitable selection method, which is referred to generally and in the following as arbitration. Within the scope of the invention, it is assumed that a 16-bit random number (values from 1 to 65536) is adequate to ensure with sufficient probability that no two tags have generated the same random number, which subsequently also gains selection in the relevant access. Since the full bit width of the random number is available at every arbitration, the probability of a tag collision in the random number space decreases.

For the purpose of preselecting a transponder or sensor, a selection bit sequence can be transmitted by the reading device to the tags in a bitwise manner known per se and is compared bitwise with the identifying bit sequence. Thus, in accordance with the foregoing discussion, reliable arbitration is ensured, even in open systems, especially when an at least partially random identifying bit sequence is used. The comparison criterion here is preferably transmitted by the base station to the tags, and can depend on a bit position of the bits of the identifying bit sequence and the selection bit sequence that are to be compared.

The data fields of the identifying bit sequence that contain the aforementioned random number can be adaptively changed in accordance with the invention with ongoing arbitration, i.e. with increasingly restrictive limitation of the number of tags addressed, to which end a bit length of the random number is adjusted, in particular reduced, as a function of a progress of the bitwise comparison. Thus, for example, at the start of arbitration a 16 bit long random number can be used, which is reduced to only a few bits based on the progress of the selection method.

In order to singularize a tag, as determined by the comparison between the identifying bit sequence and the selection bit sequence, a tag can be selected and the selection process can be terminated by a control end signal from the reading device. If the relevant tag has participated in the arbitration up until this point in time, which is to say it has not been muted as determined by the comparison, it is considered to be selected in a preliminary manner by the reading device, and the connection switches to an asynchronous transmission mode in which the reading device transmits no more potentially interfering notch signals.

In order to make the aforementioned control end signal detectable in a simple manner, a variant of the inventive method provides that before transmitting the selection bit sequence, the reading device transmits header data, referred to as the return header, containing reference symbols for recognizing the control end signal. For example, these header data can have four partial symbols with specific time duration, as is known from the application DE 102004014562.8 already cited, wherein, according to the invention, a specific multiple of the corresponding duration can be used in each case as the time reference for the control end signal. Moreover, according to another embodiment of the method, the reading device can also transmit reference symbols in the aforementioned header data to select an asynchronous return data link from the tag to the reading device.

Following the control end signal, according to a further embodiment, only payload data and optionally additional check symbols can be transmitted during the asynchronous protocol segment; arbitration does not take place in this segment, while a length of the segment typically exceeds that of the arbitration segment (the identifying bit sequence). Thus, ID lengths between 64 and 128 bits are typical, but in what are called license plate applications the data length can be up to 500 bits. The issuance of these data (ID bits, contents of an addressable data area and/or remaining portion of the random number) preferably takes place using what is called an auto-decrement function.

According to an embodiment, the asynchronous protocol segment can be terminated by an additional control signal from the reading device. There follows an acknowledgement segment by which the preliminary selection of a tag is confirmed or rejected by the reading device. Accordingly, in this acknowledgement segment the reading device informs the tag in a suitable manner whether it has finally been selected or whether the completed preliminary selection is to be discarded.

The acknowledgement segment can have a synchronous organization and be transmitted in a synchronous mode for the purpose of application-specific flexibility of the method. Accordingly, it is also possible as an alternative for the acknowledgement segment to be transmitted in a synchronous mode.

In the above-mentioned acknowledgement segment, the reading device or tag can transmit check data such as CRC data (cyclic redundancy check) in the synchronous mode; these data are compared with complementary check data in the respective receiver to confirm or discard the preliminary selection. For example, the CRC can relate to the data transmitted in the asynchronous portion. Moreover, a simple acknowledgement signal (ACK) is sufficient, if applicable, if check symbols are already present in the asynchronous portion that then need only be confirmed with an ACK symbol. Moreover, the reading device can (also) transmit (back) the random number that led to selection of one or more tags as confirmation. However, the present invention preferably provides that the tag transmits a check symbol bit-for-bit along with the data within the actual data bits, i.e. together with them in what is called "security encoding," as described in German application DE 10 2004 013 837, which corresponds to U.S. Publication No. 20050210360, which is incorporated herein by reference. When such a coding is not selected, the tag can transmit a CRC at the end of the ID.

In order to confirm the preliminary selection, in an embodiment, a confirmation signal is transmitted to the tag by the reading device in the acknowledgement segment. This signal, too, can be a notch signal from the reading device. According to the invention, if the notch signal is located outside a predefined time window (confirmation period), e.g., a period corresponding to 16 bits according to a bit length reference time of the asynchronous return link, or if it is entirely absent, the tag discards its preliminary selection.

To activate at least the asynchronous data transmission during the at least one protocol segment, provision is made according to the invention that a corresponding activation command is transmitted by the reading device to the tags. In order to advantageously accelerate the overall (anticollision) procedure, an extremely preferred embodiment of the inventive method provides that the activation command is stored in the tags, e.g. in a register, and is executed again upon subsequent reception of a repeat command. In particular, the repeat command is shortened relative to the activation command.

The entire procedure can thus be shortened if, following reception of a short repeat command by the tag, a previously received command is not overwritten, but instead is reactivated.

Accordingly, the object stated at the outset is also attained by a method for controlling a data transmission, in particular an anticollision procedure, in RFID or remote sensing systems having a plurality of transponders or sensors, in particular systems having a plurality of reading devices, wherein a command structure transmitted by a reading device to at least one transponder or sensor for transmission of data by the transponder or sensor is executed and stored by the transponder or sensor with additional parameter and/or address extensions, and wherein the stored command is executed again following reception of a subsequent repeat command.

In this regard, however, it should first be ensured that the newly received command is valid, so that the check data of the repeat command are checked before repeated execution of the activation command.

When using anticollision routines based on pointers, provision can be made that the command structure contains, as an extension, a pointer to a memory block and a bit address of the tag.

To further accelerate the anticollision method, the repeat command is preferably shortened relative to the activation command.

In order to preclude overwriting of the stored command, a further embodiment provides that reception of the repeat command prevents storage of this command, which is to say the repeat command.

To improve the transmission rate and thus provide further acceleration, provision can be made that the repeat command contains a control symbol to activate a transmission of check symbols together with payload data within individual data bits of the latter.

According to another embodiment, the repeat command contains an acknowledgement bit to confirm or discard the preliminary selection of a tag. For example, the newly received command can contain an acknowledgement bit in the form of an ACK or NACK symbol (NACK: NOT acknowledged, corresponding, for example, to a logic "0"); a NACK symbol then results, for example, in the above-described repeat procedure, whereas, in contrast, an ACK symbol (logic "1") confirms the selection of the tag, whereupon the tag switches to a mute mode and no longer participates in the anticollision until it receives an appropriate reset command.

On the other hand, reception of a NACK symbol permits the following continuations by prior agreement in the protocol, according to the invention: 1) the last tag selected discards the result of the last arbitration and participates in the next arbitration in the normal manner; or 2) the last tag selected does not discard the result of the last arbitration and transmits a data stream again following the subsequent return link header data (see below). Since the other tags know, according to the agreement, that no arbitration is taking place and thus do not participate in the transmission.

The inventive method then preferably begins directly with the transmission of the return link header data (the return header; see above) as the first segment of an inventive return link, which accordingly includes the following:

the aforementioned header segment for reference transmission and for switching to the asynchronous mode;

a random segment in which the reading device transmits a selection bit sequence with a length of n bits. When the arbitration takes place in full-duplex (in the time domain), the reading device, on the basis of the random number received from the tags, can transmit to the tags a decision that, for at least one tag, corresponds to the random number transmitted by that tag; if the tag has a smaller bit length than the, e.g. 16 bits described above, for cost reasons, then the bit sequence can be filled out with the memory contents of the tag; this segment can be used to construct acknowledgement CRC data;

a separator (control signal) from the reading device to terminate the deterministic, notch-controlled selection process;

an asynchronous data segment in which the tag backscatters its ID or a requested data stream;

another separator (control end signal) from the reading device to terminate the (asynchronous) data segment; and/or an acknowledgement segment with predefined length (e.g., 16 bits) that is controlled by the reading device.

However, it is also possible for the tag to asynchronously transmit the ID and an associated CRC, whereupon only an ACK symbol need be transmitted by the reading device. This procedure is only impracticable when a transmitted command refers to a data element that is not uniquely demarcated. In such cases, additional control quantities and fields are always required.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3a shows a first step of a data transmission scheme according to a first embodiment of the inventive method;

FIG. 3b shows a subsequent step of the method according to FIG. 3a;

FIG. 4 shows a data transmission scheme according to a second embodiment of the inventive method;

FIG. 5 shows a data transmission scheme according to a third embodiment of the inventive method;

FIG. 6 shows a data transmission scheme according to a fourth embodiment of the inventive method.

DETAILED DESCRIPTION

Figure 1:
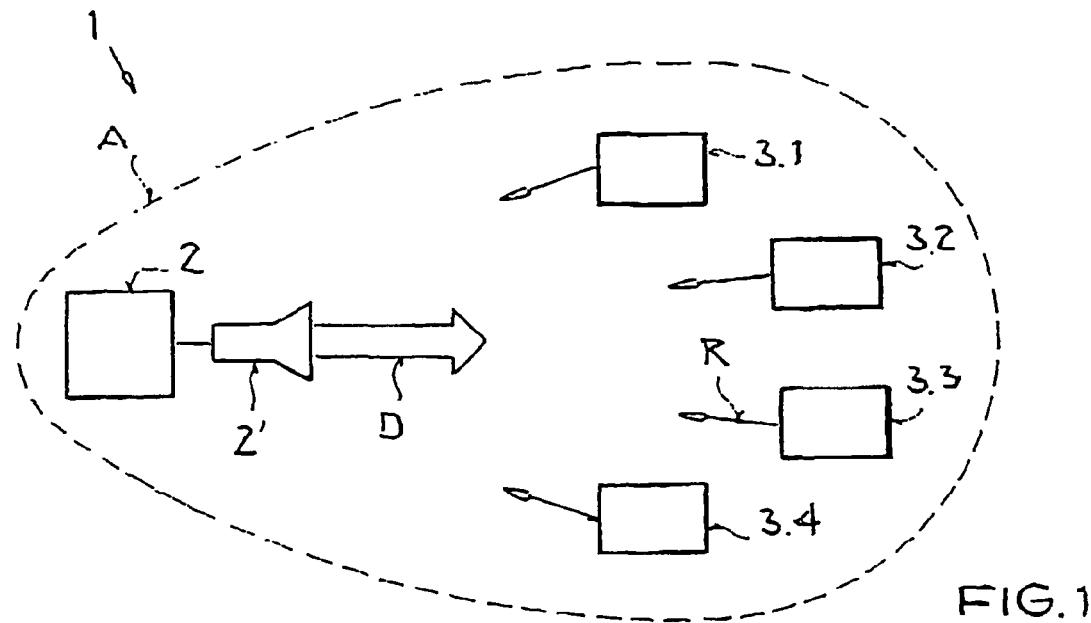
FIG. 1 shows schematically shows an RFID system with a reading device and a number of tags (transponders or remote sensors) in the response area of the reading device.

FIG. 1 shows an RFID system 1 with a reading device 2 in connection with a suitable transmitting and receiving devices 2', such as a dipole antenna, and a number of transponders 3.1-3.4, which are all located in a response area A of the reading device 2.

A data stream D transmitted by the reading device 2 or the transmitting device 2' here is received substantially simultaneously by all transponders 3.1-3.4. The data transmission from the reading device 2 to a transponder 3.1-3.4 is henceforth referred to as the forward link. The transponders 3.1-3.4 answer at least a completed data transmission from the reading device 2 through return links R, wherein a part of the energy from the reading device 2 arriving at the transponder 3.1-3.4 together with the data stream D is reflected (backscattered; referred to as backscattering) and is, if applicable, modulated for data transmission from the transponders 3.1-3.4 to the reading device 2. When a full-duplex-capable system 1 is employed (simultaneous transmission in the forward and return links), data transmission to the reading device 2 can take place even during the forward link.

For certain applications, it may be necessary for the reading device 2 to select (singularize) a specific transponder 3.1-3.4 or a group of transponders, in order to communicate specifically with them, for example for programming applications.

Although regular reference is made to transponders here and in the material that follows, the present invention is also applicable to systems having a number of remote sensors, also in combination with a number of transponders, if applicable.

Figure 2:
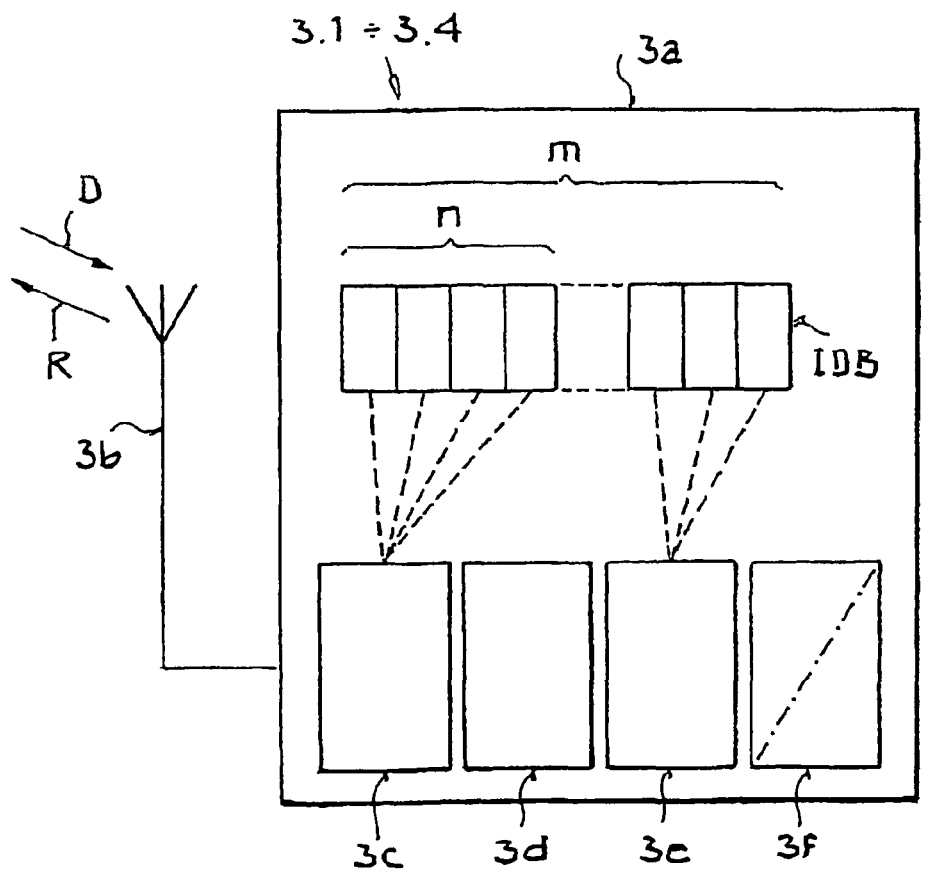
FIG. 2 shows a block diagram of a tag from FIG. 1.

FIG. 2 schematically shows a transponder 3.1-3.4 of an RFID system 1 from FIG. 1 by means of a block diagram. Accordingly, the transponder 3.1-3.4 has at least one integrated circuit (IC) 3a and has a (dipole) antenna 3b as an external circuit for transmitting and receiving data D, R including commands and control signals (notch signals) and, if applicable, energy. The transponder 3.1-3.4 from FIG. 2 further has a random number generator 3c, comparison device 3d, in particular for deterministic arbitration, storage device 3e such as an EEPROM, and a CRC generator 3f with a corresponding register, which can also be designed in several sections (dotted/dashed line) so as to be able to determine CRC values that are independent of one another (see below in this regard).

The transponder 3.1-3.4 is designed to provide an identifying bit sequence IDB having a length of m bits, where some of the m bits originate from the random number generator 3c, thus containing a random number of m bits, and some bits reproduce a memory content of the storage means 3e, in particular when the random number generator 3c is not capable of generating a sufficiently long random number (e.g., for reasons of cost). This composition of the identifying bit sequence IDB is symbolized in FIG. 2 with dashed connecting lines.

The identifying bit sequence IDB is used in a conventional manner for deterministic selection of the transponder 3.1-3.4 by the reading device 2 (FIG. 1). To this end, it is necessary for the reading device 2 to transmit a suitable selection bit sequence, which is compared bitwise with the identifying bit sequence IDB by the comparison device 3d of the transponder 3.1-3.4. Based on the comparison result, the transponder 3.1-3.4 is then at least preliminarily selected (e.g., by setting a corresponding flag in the storage means 3e). Moreover, the bit length m of the sequence IDB can be adaptively adjusted (which is to say, shortened) depending on the progress of the arbitration (limitation of the number of transponders still being addressed).

According to the invention, only a partial bit sequence, having bit length n with n≦m, of the identifying bit sequence is effectively used for arbitration (cf. FIG. 2), wherein the reading device 2 transmits an appropriate control signal terminating the deterministic (synchronous) arbitration after a comparison of n bits.

The transponder 3.1-3.4 then asynchronously transmits at least ID data or other memory contents from its storage device 3e in the backscatter; this is described in greater detail below with reference to FIGS. 4 through 6.

FIGS. 3a and 3b first schematically show the concept of an accelerated deterministic arbitration such as can be used within the inventive data transmission method, using respective example data transmissions between transponder and reading device. FIG. 3a shows, represented as a function of time (t), first (on the left) how the reading device (FIG. 1) transmits header data H1 with reference symbols, followed by command data CO with associated parameter data PA, a long command with a length>8 bits, for example 24 bits for commands based on pointers. The long command preferably activates the data transmission method, for example in an embodiment as "random mode" in which the arbitration takes place exclusively or at least primarily by means of the random portion of the identifying bit sequence IDB (see FIGS. 4 through 6 below). This is followed by an EOT field EOT1 (EOT: end of transmission), whereupon the reading device transmits a return header H2 that contains references for the return link R (FIG. 1), which according to the invention can additionally be used, for example, to select the aforementioned random mode, as described in principle in the aforementioned German application DE 102004014562.8. Then, following an additional header segment H2, the aforementioned deterministic arbitration DA takes place using an identifying bit sequence IDB (FIG. 2) with a random number RA and, if applicable, an additional ID component ID, which can optionally take place in either half-duplex or full-duplex mode. The header data H2 contain, in particular, reference symbols for detecting the EOF signal (EOF: end of frame) from the reading device that follows.

The arbitration stream ends with an EOF field EOF, followed by a CRS acknowledgement segment CRC-Q and another EOT field EOT2. The acknowledgement segment CRC-Q is used by the reading device to inform the transponder whether it has finally been selected or whether it should discard the (preliminary) selection. However, the CRC segment does not necessarily follow, since it is possible that the "security encoding" described above may have already been chosen for the arbitration segment DA. The latter is preferably used when the data length of a transmission from the tag is not fixed; for short IDs (64 or 96 bits) with a definite end, even a normal encoding scheme with subsequent CRC is adequate, although it has the inherent disadvantage that the complete transmission must be received in order to be truly certain of its integrity.

In this regard, if, for example, "security" data are not present, or a reversed CRC is received, the reading device can follow another path in which no tag responds, and then transmit an EOF symbol. The complete process can then be repeated by means of a subsequent NACK.

In subsequent transmission steps, as shown in FIG. 3, abbreviated command structures (short commands), known as repeat commands RC, are used as repeat commands in place of the long commands CO, PA. These have a length of 8 bits, with a 5 bit long command structure CS, one parameter bit or control bit PSB, and two CRC bits CB, as shown schematically in FIG. 3b. The control bit PSB of the repeat command can, for example, serve as the control symbol to activate or deactivate a transmission of check symbols together with payload data within the latter's individual data bits—as already described above in detail ("security encoding").

Alternatively, the aforementioned parameter or control bit PSB can also function as an acknowledgement bit. Especially in the case of an anticollision procedure with an asynchronous return link component, it can occur that the reading device detects a (transmission) error in the asynchronous protocol segment. In the prior art, the reading device would now have to issue a READ command that addresses the tag in question. This, however, is a long command with more than 8 bits, which is longer than the short command previously used to accelerate the anticollision. It is thus preferable to use the acknowledgement bit already described, in the form of an ACK/NACK symbol within the repeat command RC, with a logic value of "1" representing ACK (=match) and a logic value of "0" representing NACK (=no match). In the case of an ACK, the last tag addressed switches to a mute mode; if a tag was selected in the course of an arbitration, it sets a flag indicating that the tag in question is selected. On subsequently receiving another anticollision command, it switches to the mute mode and no longer participates in the anticollision routine. Thus, an ACK confirms to the tag that it can actually switch to the mute mode.

In the use of the repeat command RC described above, the long command previously received by the transponder (and, for example, held in the storage means 3e) is not overwritten, but instead is reactivated and executed again, as described with FIG. 3a. In this way the anticollision method can be shortened in time, as can be seen from a comparison of FIGS. 3a and 3b.

An additional accelerating effect also results from the given, reduced bit error rate, since fewer potential interferers/interference events exist due to the shortened, deterministic and synchronous protocol segments.

Following completed successful selection of a transponder or group of transponders, the reading device can interrogate the transponder further (request data), or program it, or transmit a new arbitration command.

FIGS. 4 through 6 show other, different embodiment of the data transmission method, which can in particular be advantageously combined with the concepts described above using FIGS. 3a, 3b. The methods shown each begin with a transmission of the above-described header data H1, command data (long command CO, PA or repeat command RC) and an EOT field EOT1. This is followed in each case by a synchronous transmission segment SYNC, which contains a header section H2 (see above) and random data RA, followed by an EOF symbol EOF1. The synchronous data segment SYNC is used for arbitration purposes; the EOF signal terminates the arbitration as soon as a transponder or group of transponders is selected. Thus, the synchronous transmission phase, during which the reading device transmits potentially interfering notch signals, is also limited to the minimum necessary for arbitration. The arbitration can, as described above, take place in full-duplex or half-duplex operation.

In each case, the synchronous segment SYNC is followed by an asynchronous and thus "notch free" segment ASYNC, which can have different (bit) lengths and different data structures in the different embodiments shown:

In FIG. 4, only ID data ID of the transponder are transmitted during the asynchronous segment. Thereafter, the system switches back to synchronous transmission SYNC to transmit another EOF signal EOF2, followed by an acknowledgement segment CRC-Q (see above). The transmission in FIG. 4 is terminated by an EOT signal EOT2. As already stated, the acknowledgement segment is used by the reading device to inform the transponder whether it was finally selected or whether it should discard the (preliminary) selection.

In the synchronous mode of the acknowledgement segment, a comparison, for example between a CRC field transmitted by the reading device and CRC data generated in the transponder itself, e.g. in the comparison means 3d (FIG. 2) suitably designed for this purpose, leads to a determination of the selection state. In this context, the transmitted CRC field must, in particular, be independent of CRC data of the data area ID, since the latter are not unique on account of the asynchronous interrupt EOF2.

In FIG. 5, both the ID data ID and the subsequent acknowledgement data CRC-Q are transmitted asynchronously. Between these, the reading device transmits a single separator N to separate the two data segments ID, CRC-Q. The separator can again be a notch signal N.

The acknowledgement segment CRC-Q includes a specific number of bits, for example 16, but is controlled in terms of its length by the reading device. This can be seen from the final FIG. 6, according to which the reading device terminates the acknowledgement segment CRC-Q (early) by transmitting a notch signal N'. In this way, the acknowledgement process can be structured according to the invention such that in the event of an accepted selection/comparison result, the reading device must transmit the aforementioned notch signal N' within a specific time window in the form of a confirmation period, for example before the expiration of a time corresponding to the example 16 bits described above. If the signal is located outside the agreed-upon time window, in the manner of an "error acknowledgement," e.g. after 17 bits, the transponder must discard the preliminary selection. In addition, the notch signal N' starts the decoding of a new command sequence (programming, data query, arbitration, etc.)

Thus, it is possible for the transponder to generate a CRC over a received bit sequence and transmit it to the reading device. To this end, the CRC generator 3f (FIG. 2) of the transponder 3.1-3.4 is first set to an initial state. Since the generator equation must be known to the reading device for communications reasons, the random number generator 3c can be designed in any way desired. In this regard, it is necessary to observe the condition that the random number can only enter into the CRC to the extent that it has been queried by the reading device. For example, if only 3 bits out of 16 have been queried, then only 3 bits should be used in determining the CRC data. Due to the aforementioned requirement for independence of the CRC data for the asynchronous data segment ID and the acknowledgement segment CRC-Q, such a procedure is possible, in particular, when two independent CRC generators are used during the communication, which is frequently the case in practice; this is symbolized in FIG. 2 by the dotted/dashed line in the middle of the generator 3f.

In accordance with the discussions of FIGS. 4 through 6, the actual arbitration within the arbitration method takes place exclusively through the random number within the identifying bit sequence IDB (FIG. 2) ("random mode,") and is terminated (early, before the processing of the entire identifying bit sequence IDB of the transponder 3.1-3.4) by an EOF symbol from the reading device, whereupon the transponder stores the status "arbitration succeeded" in its memory. Further developments of the method that are useful in practice then provide, in particular, that the transponder ID must then be output (anonymous read; cf. ISO 18000-6, Type 6), or that the desired data, e.g., starting with a start address of an EEPROM content addressed by the command CO, PA (see above) must then be transmitted by the transponder (truncated replay); in both cases, this may be automatic.

In this context, "anonymous read" means that the ID need not be known; it belongs to the "next record", i.e. it is output afterwards. "Truncated replay" refers to a method in which the reading device already knows parts of the ID or the contents of the memory, so that they need not be repeated in the asynchronous portion; instead, the address vector is immediately advanced.

Such a random mode (see above) has the further advantageous consequence according to the invention that the arbitration is performed bitwise, using a random number generator that in the extreme case is only 1 bit wide and whose generated random number is then correspondingly fed in bitwise. In the case of a special five bit long generator (LFSR: linear feedback shift register) a 4-bit value is "extracted" every 4 bits, so that the entire bit supply of the LFSR (0 to 15) is available. One advantage of this embodiment is a reduced circuit complexity with a simultaneously reduced current consumption. In addition, the random number field can be made as long as the application requires, namely between one bit and a theoretically infinite number of bits, without requiring a circuit change.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for selecting at least one transponder or sensor in RFID or remote sensor systems having a plurality of transponders or sensors with at least one reading device, the method comprising:
deterministically preselecting individual transponders or sensors by at least one reading device; and
transmitting data for confirming, after preliminary selection of at least one transponder or sensor has taken place, asynchronously from the transponder or sensor to the reading device during at least one protocol segment,
wherein the individual transponders or sensors is deterministically preselected based on a bitwise comparison of a unique, statically defined identifying bit sequence with a selection bit sequence transmitted by the reading device.

2. The method according to claim 1, wherein a first bit sequence with a length of m bits is generated by the transponders or sensors for purposes of selection.

3. The method according to claim 2, wherein the first bit sequence is generated when an asynchronous transmission mode has been selected for a return data link from the transponders or sensors to the reading device.

4. The method according to claim 2, wherein the first bit sequence is produced from a random number and/or a memory content.

5. The method according to claim 4, wherein a bit length of the random number is adjusted or reduced, as a function of a progress of the bitwise comparison.

6. The method according to claim 4, wherein the preselected transponder or sensor transmits the random number and optionally associated check data or CRC data.

7. The method according to claim 1, wherein, for the purpose of preselection of the transponder or sensor, the identifying bit sequence has a length of n bits, where n≦m.

8. The method according to claim 7, wherein the identifying bit sequence is extracted from the first bit sequence.

9. The method according to claim 1, wherein, for the purpose of preselecting a transponder or sensor, a selection bit sequence is transmitted by the reading device to the transponders or sensors in a bitwise manner and is compared bitwise with the identifying bit sequence.

10. The method according to claim 9, wherein, as determined by the comparison, a transponder or sensor is selected and the selection process is terminated by a control end signal from the reading device.

11. The method according to claim 10, wherein, before transmitting the selection bit sequence, the reading device transmits header data containing reference symbols for recognizing the control end signal.

12. The method according to claim 10 wherein, before transmitting the selection bit sequence, the reading device transmits header data containing reference symbols for selecting an asynchronous return data link from the transponder or sensor to the reading device.

13. The method according to claim 1, wherein payload data and optionally additional check symbols are transmitted during the at least one protocol segment.

14. The method according to claim 13, wherein the check symbols are transmitted together with the payload data within individual data bits of the latter.

15. The method according to claim 1, wherein the at least one protocol segment is terminated by an additional control signal from the reading device.

16. The method according to claim 1, wherein the at least one protocol segment is followed by an acknowledgement segment by means of which a preliminary selection of a transponder or sensor is confirmed or rejected by the reading device.

17. The method according to claim 16, wherein the reading device or the preselected transponder or sensor transmits check data, such as CRC data, which are compared with complementary check data in a respective receiver to confirm or discard the preliminary selection.

18. The method according to claim 16, wherein the check data are independent from optional check symbols of the asynchronous protocol segment.

19. The method according to claim 16, wherein the acknowledgement segment is transmitted in a synchronous mode.

20. The method according to claim 19, wherein, in order to confirm the preliminary selection, a confirmation signal is transmitted to the transponder or sensor by the reading device in the acknowledgement segment.

21. The method according to claim 19, wherein, if a confirmation signal is absent, at least within a confirmation period, the transponder or sensor discards its preliminary selection.

22. The method according to claim 1, wherein, in order to activate at least the data transmission during the at least one protocol segment, a corresponding activation command is transmitted by the reading device to the transponders or sensors.

23. The method according to claim 22, wherein the activation command is stored in the transponders or sensors, and is executed again upon subsequent reception of a repeat command.

24. The method according to claim 23, wherein the repeat command is shortened relative to the activation command.

25. The method according to claim 23, wherein check data of the repeat command are checked before repeated execution of the activation command.

26. The method according to claim 23, wherein the repeat command contains a control symbol to activate a transmission of check symbols together with payload data within individual data bits of the latter.

27. A method for controlling a data transmission or an anticollision procedure, according to claim 1, in RFID or remote sensing systems having a plurality of transponders or sensors, wherein a command structure transmitted by a reading device to at least one transponder or sensor for transmission of data by the transponder or sensor is executed and stored by the transponder or sensor with additional parameter and/or address extensions, and wherein the stored command structure is executed again following subsequent reception of a repeat command.

28. The method according to claim 27, wherein check data of the repeat command are checked before repeated execution of the activation command.

29. The method according to claim 27, wherein the command structure contains, as an extension, a pointer to a memory block and a bit address of the tag.

30. The method according to claim 27, wherein the repeat command is shortened relative to the activation command.

31. The method according to claim 27, wherein reception of the repeat command prevents storage thereof.

32. A method for controlling a data transmission or an anticollision procedure in RFID or remote sensing systems having a plurality of transponders or sensors,
wherein a command structure transmitted by a reading device to at least one transponder or sensor for transmission of data by the transponder or sensor is executed and stored by the transponder or sensor with additional parameter and/or address extensions, and wherein the stored command structure is executed again following subsequent reception of a repeat command, and
wherein the repeat command contains a control symbol to activate a transmission of check symbols together with payload data within individual data bits of the latter, and
wherein the method comprises:
deterministically preselecting individual transponders or sensors by at least one reading device; and
transmitting data for confirming, after preliminary selection of at least one transponder or sensor has taken place, asynchronously from the transponder or sensor to the reading device during at least one protocol segment.

33. A method for controlling a data transmission or an anticollision procedure in RFID or remote sensing systems having a plurality of transponders or sensors,
wherein a command structure transmitted by a reading device to at least one transponder or sensor for transmission of data by the transponder or sensor is executed and stored by the transponder or sensor with additional parameter and/or address extensions, and wherein the stored command structure is executed again following subsequent reception of a repeat command, and
wherein the repeat command contains an acknowledgement bit to confirm or discard the preliminary selection of a transponder or sensor, and
wherein the method comprises:
deterministically preselecting individual transponders or sensors by at least one reading device; and
transmitting data for confirming, after preliminary selection of at least one transponder or sensor has taken place, asynchronously from the transponder or sensor to the reading device during at least one protocol segment.

* * * * *